US011752816B2

(12) United States Patent
Poston et al.

(10) Patent No.: US 11,752,816 B2
(45) Date of Patent: Sep. 12, 2023

(54) TRAILER HITCH ASSEMBLY

(71) Applicant: Ford Global Technologies, LLC, Dearborn, MI (US)

(72) Inventors: Derek Matthew Poston, Bloomfield Hills, MI (US); Kevin A. Gustafson, Monroe, MI (US); Vishnuvarthan Murugesan Moongilpatti, Canton, MI (US); Vladimir Vladimirovich Bogachuk, West Bloomfield, MI (US); Conor Daniel Hennessey, South Hadley, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 17/225,975

(22) Filed: Apr. 8, 2021

(65) Prior Publication Data
US 2022/0324278 A1 Oct. 13, 2022

(51) Int. Cl.
*B60D 1/48* (2006.01)
*B62D 21/02* (2006.01)
(52) U.S. Cl.
CPC ............. *B60D 1/488* (2013.01); *B60D 1/485* (2013.01); *B62D 21/02* (2013.01)
(58) Field of Classification Search
CPC ................................ B60D 1/485; B60D 1/488
See application file for complete search history.

(56) References Cited

U.S. PATENT DOCUMENTS

| 7,971,895 | B2* | 7/2011 | Kozuka | B60D 1/485 |
| | | | | 280/495 |
| 8,678,423 | B1* | 3/2014 | Hwang | B60R 19/34 |
| | | | | 280/505 |
| 9,228,628 | B2 | 1/2016 | Alavandi et al. | |
| 9,914,332 | B2* | 3/2018 | Jordan | B60D 1/52 |
| 2016/0214450 | A1* | 7/2016 | McGuckin | B60D 1/488 |

FOREIGN PATENT DOCUMENTS

| CN | 110962937 A | 4/2020 |
| FR | 2869263 B1 | 4/2007 |
| FR | 3124983 A1 * | 1/2023 |

* cited by examiner

*Primary Examiner* — Kevin Hurley
(74) *Attorney, Agent, or Firm* — Lorne Forsythe; Bejin Bieneman PLC

(57) ABSTRACT

A vehicle includes a vehicle frame. The vehicle frame includes a frame rail elongated along a vehicle-longitudinal axis that defines a hole. The vehicle includes a trailer hitch mount supported by the frame rail. The vehicle includes a face plate supported by the trailer hitch mount that defines an opening extending through the face plate that is aligned with the hole of the frame rail. The trailer hitch mount extends through the opening and is completely surrounded by the face plate. The trailer hitch mount extends into the hole of the frame rail along the vehicle-longitudinal axis.

21 Claims, 4 Drawing Sheets

TRAILER HITCH ASSEMBLY

BACKGROUND

Vehicles may include trailer hitch assemblies used for towing other vehicles or trailers. The trailer hitch assemblies serve as attachment points for straps, chains, or trailer hitches to be attached to the vehicle, and the straps, chains, or trailer hitches are then used to pull the other vehicle or trailer along a roadway. The trailer hitch assembly may be fixed to a vehicle frame of the vehicle so that the pulling force on the trailer hitch assembly is transmitted to the vehicle frame. The trailer hitch assembly may be located at a rear end of the vehicle.

DETAILED DESCRIPTION

Figure 1:
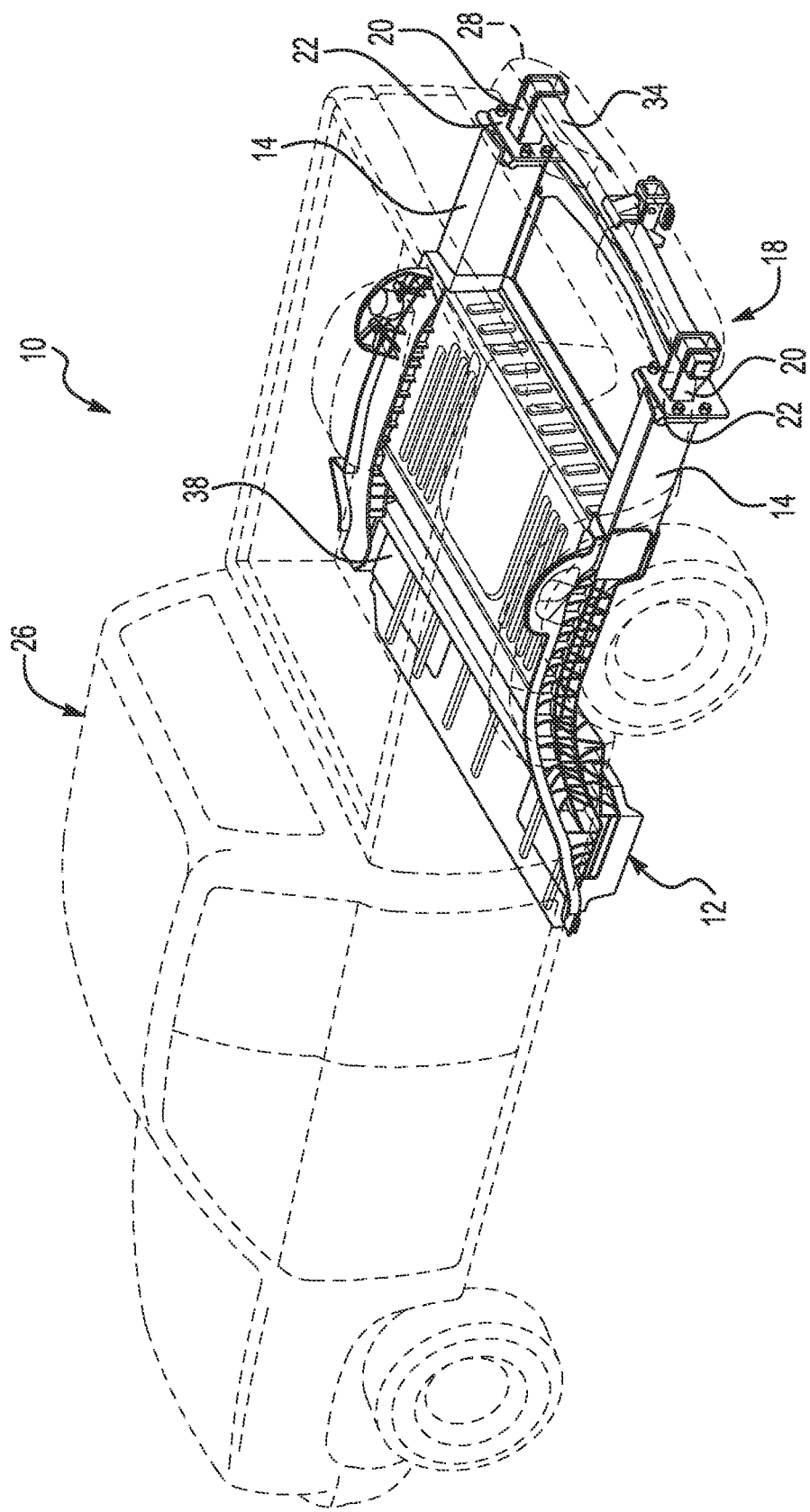
FIG. 1 is a perspective view of a vehicle having a trailer hitch assembly.

A vehicle includes a vehicle frame including a frame rail elongated along a vehicle-longitudinal axis. The frame rail defines a hole. The vehicle includes a trailer hitch mount supported by the frame rail. The vehicle includes a face plate supported by the trailer hitch mount. The face plate defines an opening extending through the face plate and the opening being aligned with the hole of the frame rail. The trailer hitch mount extends through the opening and being completely surrounded by the face plate and the trailer hitch mount extending into the hole of the frame rail along the vehicle-longitudinal axis.

The vehicle may include a collar fixed to the frame rail. The face plate may be connected to the collar.

The collar may be at an end of the frame rail and extends a distance from the end of the frame rail in a vehicle-forward direction along the vehicle-longitudinal axis greater than a distance that the trailer hitch mount extends from the end of the frame rail in the vehicle-forward direction.

The frame rail may include a crushable section extending in the vehicle-forward direction from the collar, the crushable section being crushable relative to a section of the frame rail along which the trailer hitch mount extends in the hole.

The frame rail may be a hollow rectangular cross-section in a plane perpendicular to the vehicle-longitudinal axis.

The face plate may be between the collar and the trailer hitch mount.

The face plate may abut the collar.

The face plate may be connected to the collar with threaded fasteners.

The trailer hitch mount may be supported by the frame rail and the collar.

The frame rail may include a crushable section in the vehicle-forward direction from the collar, the crushable section being crushable relative to a section of the frame rail along which the trailer hitch mount extends in the hole.

The frame rail may be between the trailer hitch mount and the collar in a radial direction of the frame rail.

The face plate may be planar in a substantially vertical plane.

The vehicle may include a trailer hitch beam elongated cross-vehicle from the trailer hitch mount.

The frame rail may have a hollow rectangular cross-section in a plane perpendicular to the vehicle-longitudinal axis.

The vehicle frame may include a second frame rail elongated along the vehicle-longitudinal axis and spaced cross-vehicle from the frame rail, the second frame rail defining a second hole. The vehicle may include a second trailer hitch mount supported by the second frame rail. The vehicle may include a second face plate supported by the second trailer hitch mount, the second face plate defining a second opening extending through the second face plate and the second opening being aligned with the second hole of the second frame rail. The second trailer hitch mount may extend through the second opening and being completely surrounded by the second face plate and the second trailer hitch mount extending into the second hole of the second frame rail along the vehicle-longitudinal axis.

The vehicle may include a trailer hitch beam elongated cross-vehicle from the trailer hitch mount to the second trailer hitch mount.

The trailer hitch beam may extend through the trailer hitch mount and the second trailer hitch mount.

The vehicle may include a collar at an end of the frame rail and extends a distance from the end of the frame rail in a vehicle-forward direction along the vehicle-longitudinal axis greater than a distance that the trailer hitch mount extends from the end of the frame rail in the vehicle-forward direction. The vehicle may include a second collar at an end of the second frame rail and extends a distance from the end of the second frame rail in the vehicle-forward direction along the vehicle-longitudinal axis greater than a distance that the second trailer hitch mount extends from the end of the second frame rail in the vehicle-forward direction.

The second frame rail may include a crushable section extending in the vehicle-forward direction from the second collar, the crushable section being crushable relative to a section of the second frame rail along which the second trailer hitch mount extends in the second hole.

With reference to the Figures, wherein like numerals indicate like parts throughout the several views, a vehicle 10 includes a vehicle frame 12. The vehicle frame 12 includes a frame rail 14 elongated along a vehicle-longitudinal axis L that defines a hole 16. The vehicle 10 includes a trailer hitch assembly 18 including a trailer hitch mount 20 supported by the frame rail. The vehicle 10 includes a face plate 22 supported by the trailer hitch mount 20 that defines an opening 24 extending through the face plate 22 that is aligned with the hole 16 of the frame rail. The trailer hitch mount 20 extends through the opening 24 and is completely surrounded by the face plate 22. The trailer hitch mount 20 extends into the hole 16 of the frame rail 14 along the vehicle-longitudinal axis L.

The extension of the trailer hitch mount 20 through the opening 24 in the face plate 22 with the face plate 22 completely surrounding the trailer hitch mount 20 increases the load-carrying capacity of the trailer hitch assembly 18. Specifically, such a configuration allows for connection of the trailer hitch assembly 18 to the frame rail 14 at both the face plate 22 and along the trailer hitch mount 20 vehicle-forward of the face plate 22. This distributes loads to multiple points, specifically in multiple planes and axes to efficiently resist large and cyclical moments when load is carried by the trailer hitch assembly 18. Specifically, the connection at the face plate 22 reduces load carried by the trailer hitch mount 20 allowing for a shortened trailer hitch mount 20, and the extension of the trailer hitch mount 20 into the frame rail 14 creates a lever arm relative to the load application point to react load into the body at the point of attachment of the trailer hitch mount 20 to the frame rail. During an impact to the vehicle 10, specifically a rear impact, this shortened trailer hitch mount 20 reduces stack-up when the frame rail 14 crushes. Specifically, the frame rail 14 may be crushable to absorb energy in the event of the impact to the vehicle 10 and this reduction in stack-up increases crushable length of the frame rail 14 along the vehicle-longitudinal axis.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc.

The vehicle 10 includes the vehicle frame 12 and a vehicle body 26. The vehicle body 26 and vehicle frame 12 may have a body-on-frame construction (also referred to as a cab-on-frame construction) in which the vehicle body 26 and vehicle frame 12 are separate components, i.e., are modular, and the vehicle body 26 is supported on and affixed to the frame. As another example, the vehicle frame 12 may be of a unibody construction in which the vehicle frame 12 is unitary with a body (including frame rail, pillars, roof rails, etc.). Alternatively, the vehicle frame 12 and vehicle body 26 may have any suitable construction. The vehicle frame 12 and vehicle body 26 may be of any suitable material, for example, steel, aluminum, and/or fiber-reinforced plastic, etc.

The vehicle body 26 includes body panels (not numbered) partially defining an exterior of the vehicle 10. The body panels may present a class-A surface, e.g., a finished surface exposed to view by a customer and free of unaesthetic blemishes and defects. The body panels include, e.g., a roof, etc.

The vehicle body 26 includes a bumper 28. The bumper 28 is fixed to the vehicle frame 12. The bumper 28 may extend across a front of the vehicle 10. In an alternative, the bumper 28 may extend along a rear of the vehicle 10. The bumper 28 is elongated cross-vehicle. The bumper 28 may present a class-A surface, i.e., a surface specifically manufactured to have a high-quality, finished aesthetic appearance free of blemishes.

With continued reference to FIG. 1, the vehicle frame 12 includes a rear rail casting 38 and the frame rail 14. Specifically, the vehicle frame 12 includes two frame rails 14. The frame rails 14 are elongated along the vehicle-longitudinal axis L. The frame rails 14 may be supported by the rear rail casting 38. The frame rails 14 extend in a vehicle-rearward direction from the rear rail casting 38 and along vehicle-longitudinal axis L. The frame rails 14 are spaced cross-vehicle from each other.

Figure 4:
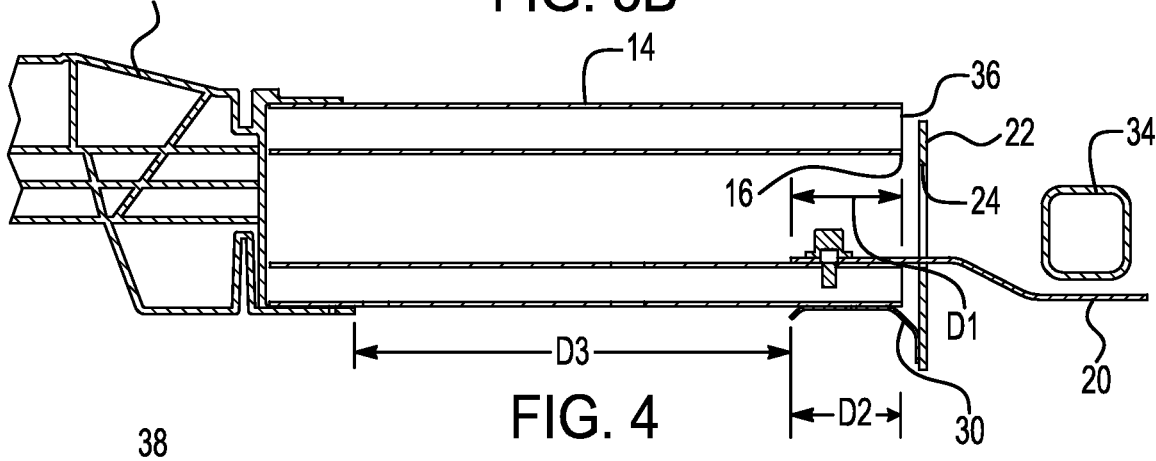
FIG. 4 is a cross-sectional view of one example of the trailer hitch mount with a length equal to a collar of the trailer hitch assembly.
Figure 5:
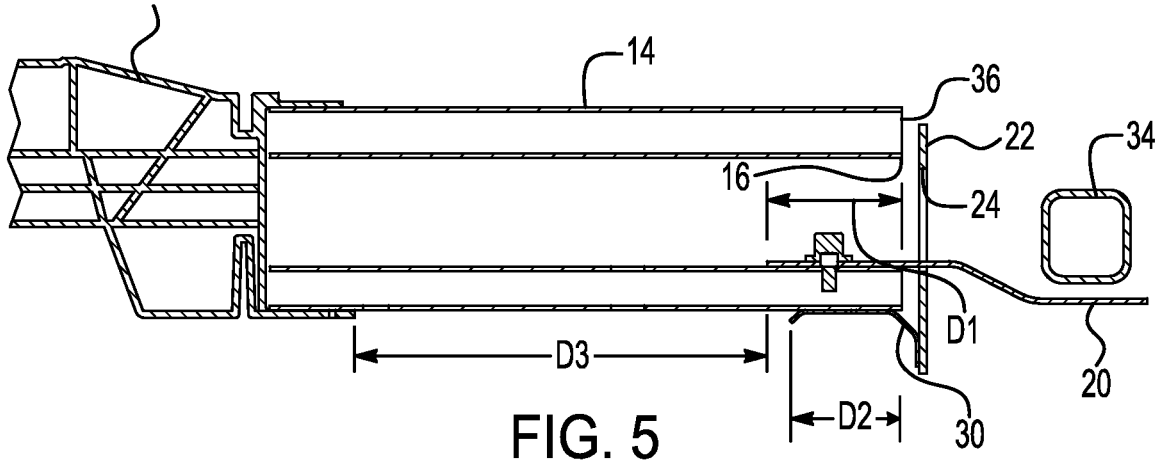
FIG. 5 is a cross-sectional view of another example of the trailer hitch mount with a length greater than the collar of the trailer hitch assembly.
Figure 6:
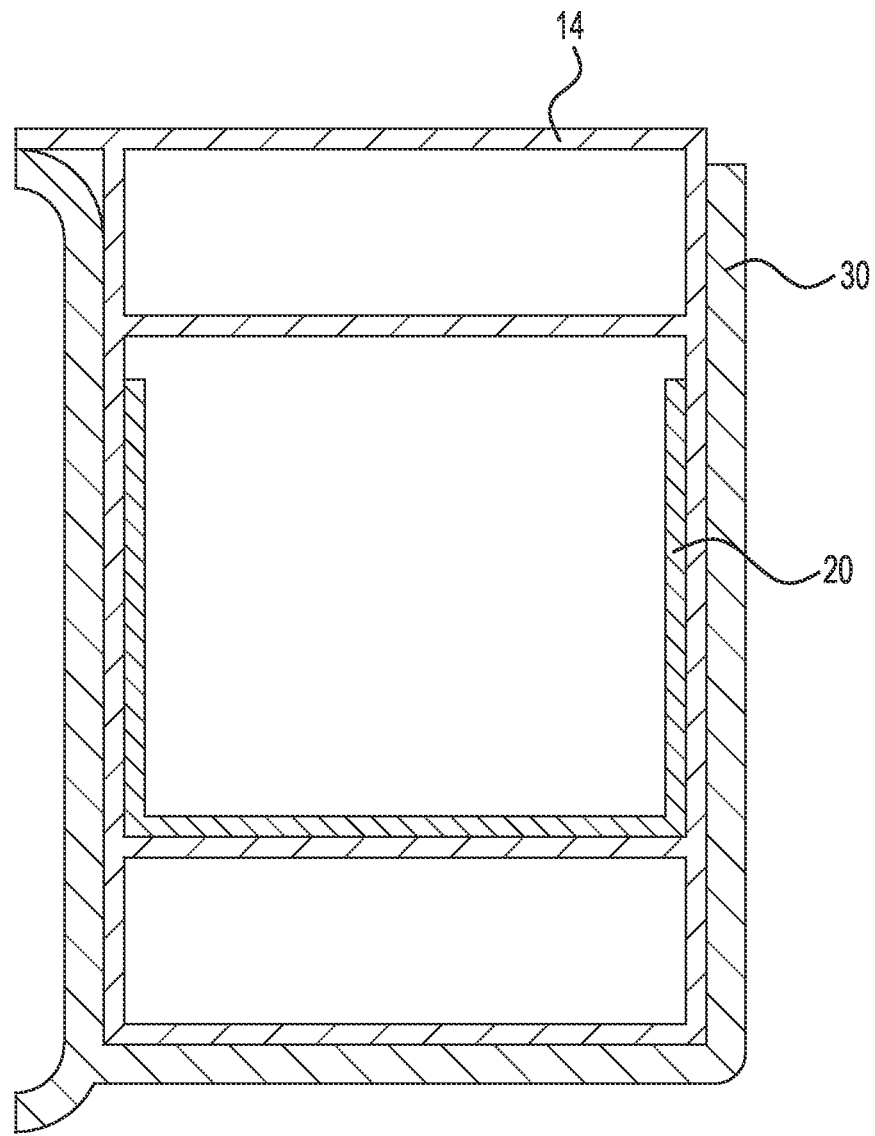
FIG. 6 is a cross-sectional view through line 6 from FIG. 3B.

With reference to FIGS. 4, 5, and 6, the frame rails 14 define the hole 16 extending along the vehicle-longitudinal axis L. The hole 16 may extend through the frame rail 14 from an end 36 of the frame rail 14 in a vehicle-forward direction. The frame rail 14 may surround the hole 16 in a plane perpendicular to the vehicle-longitudinal axis L. In other words, the frame rails 14 may be hollow. As in the example shown in FIG. 6, the frame rail 14 may have a hollow rectangular cross-section in a plane perpendicular to the vehicle-longitudinal axis L. Other components of the vehicle 10 may be inserted into the hole 16 and be supported by the frame rail. For example, as discussed below, the trailer hitch mount 20 may be inserted into the hole 16 of the frame rail 14 and be supported by the frame rail.

Figure 3A:
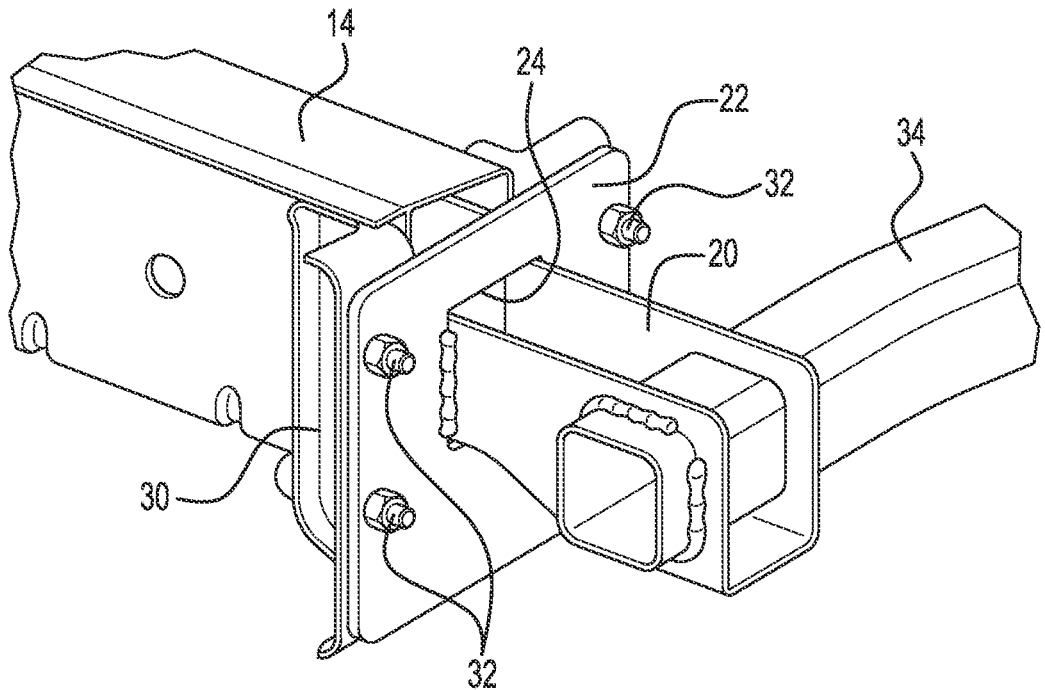
FIG. 3A is a perspective view of a trailer hitch mount supported by a frame rail of the vehicle.
Figure 3B:
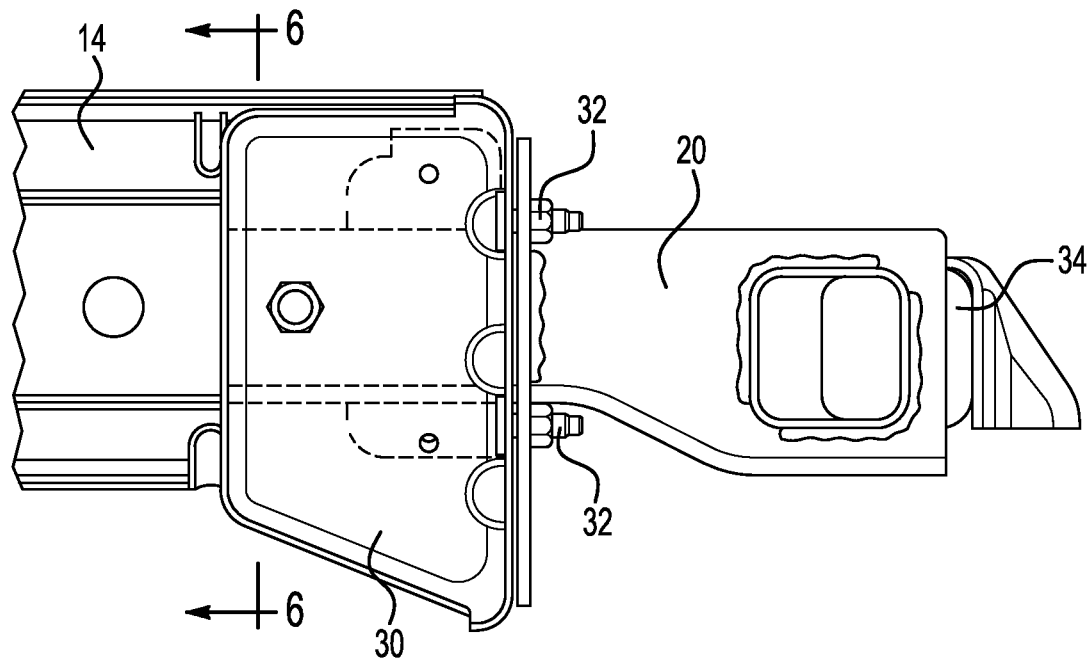
FIG. 3B is a side view of the trailer hitch mount supported by the frame rail of the vehicle.

With reference to FIGS. 1, 3A, and 3B, the trailer hitch assembly 18 may be supported by the vehicle frame 12 at the rear of the vehicle 10. Specifically, the trailer hitch assembly 18 may be elongated cross-vehicle along the rear of the vehicle 10 adjacent the bumper 28. The trailer hitch assembly 18 may be supported by the frame rails 14 at the rear of the vehicle 10. Specifically, the trailer hitch assembly 18 may extend cross-vehicle from one frame rail 14 to the other frame rail. The trailer hitch assembly 18 may extend in the vehicle-rearward direction from the frame rails 14. The trailer hitch assembly 18 may be used by a vehicle user for towing, e.g., other vehicles, trailers, etc. The trailer hitch assembly 18 may be any suitable material, e.g., metal, such as steel.

Figure 2:
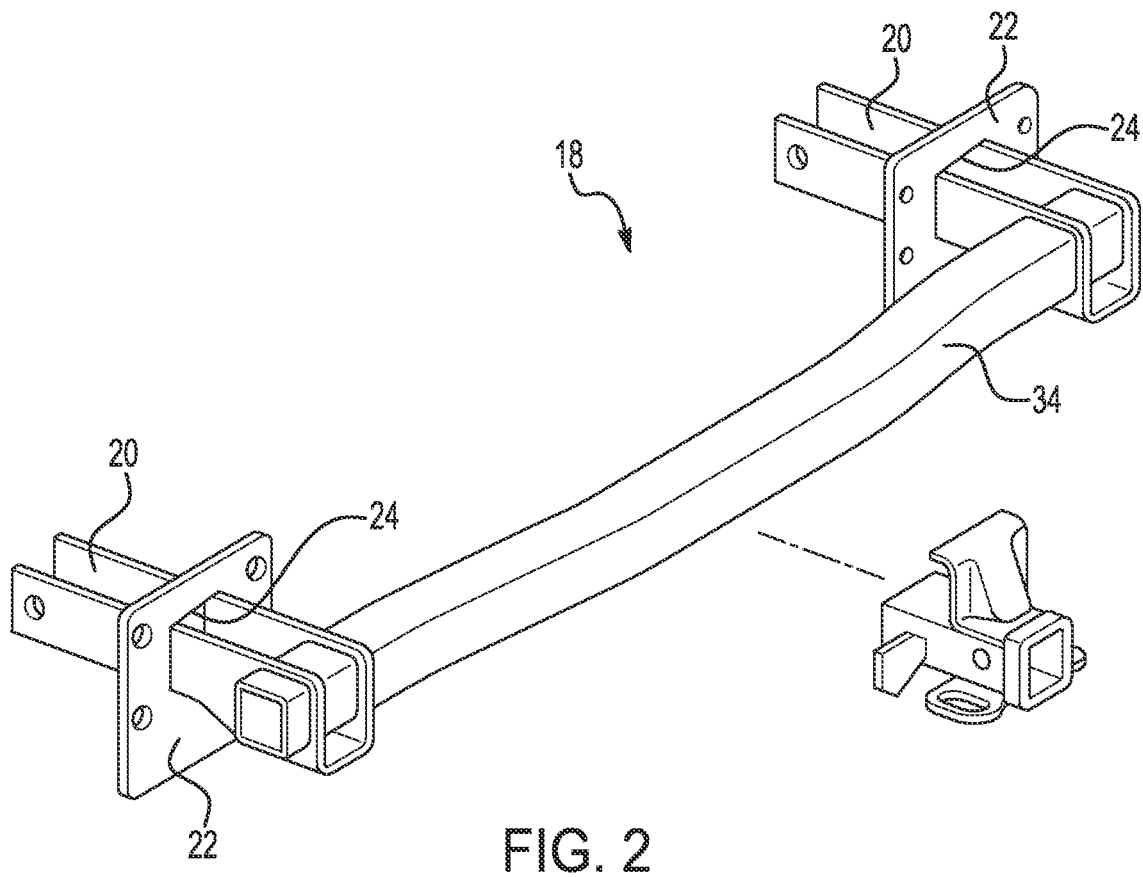
FIG. 2 is a perspective view of the trailer hitch assembly.

With reference to FIGS. 1 and 2, the trailer hitch assembly 18 includes two trailer hitch mounts 20 spaced cross-vehicle from each other. One of the trailer hitch mounts 20 is supported by one of the frame rails 14 and the other trailer hitch mount 20 is supported by the other frame rail. Specifically, the trailer hitch mounts 20 extend into the holes 16 of the respective frame rail. Each of the trailer hitch mounts 20 extend a distance D1 into each of the hole 16 in the frame rail 14 in the vehicle-forward direction along the vehicle-longitudinal axis L. In other words, each of the trailer hitch mounts 20 extends into the holes 16 of the frame rails 14 the distance D1 from the ends 36 of the frame rails 14.

With reference to FIGS. 1, 3A, and 3B, the trailer hitch mounts 20 may be fixed to the frame rails 14. The trailer hitch mounts 20 may be fixed to each of the frame rails 14 at any point along the distances D1. As an example, such as shown in the Figures, the trailer hitch mounts 20 may be removably fixed to the frame rails 14, e.g., by threaded fasteners. As another example, the trailer hitch mounts 20 may be permanently fixed to the frame rails 14 so that the trailer hitch mounts 20 are not removeable from the frame rail 14 without destruction, e.g., the trailer hitch mounts 20 may be welded to the frame rails 14.

The trailer hitch assembly 18 includes two face plates 22. The face plates 22 are supported by the trailer hitch mounts 20. Specifically, the face plates 22 may be fixed to the trailer hitch mounts 20. For example, as shown in the Figures, the face plates 22 may be welded to the trailer hitch mounts 20. In other examples, the face plates 22 may be connected to the trailer hitch mounts 20 in any suitable way, e.g., fasteners, adhesive, etc. The face plates 22 are adjacent the ends 36 of the frame rails 14. Specifically, the face plates 22 may abut the ends 36 of the frame rails 14.

The face plates 22 may be planar, i.e., substantially flat in a plane. Specifically, the face plates 22 may be planar in substantially vertical planes. These substantially vertical planes may be perpendicular to the vehicle-longitudinal axis L. In this case, the adverb "substantially" means that the face plates 22 face vehicle-rearward and may slightly deviate from vertical due to manufacturing variation, packaging constraints, vehicle loading, etc.

With continued reference to FIGS. 1, 3A, and 3B, the face plates 22 each define the opening 24 extending through the face plates 22. The opening 24 is surrounded by material of the face plate with the material extending endlessly around the opening 24, i.e., the opening 24 is an enclosed opening 24. The opening 24 may be, for example, rectangular. The opening 24 may be in substantially vertical plane, e.g., a substantially vertical plane perpendicular to the vehicle-longitudinal axis L.

The opening 24 is aligned with the hole 16 of the respective frame rail. The trailer hitch mounts 20 extend through the openings 24 of the face plates 22. Since the opening 24 is enclosed, the trailer hitch mount 20 is completely surrounded by the face plate 22. In other words, the face plates 22 extend endlessly around the trailer hitch mounts 20. The trailer hitch mounts 20 may extend through the openings 24 of the face plates 22 and into the holes 16 of the frame rails 14 along the vehicle-longitudinal axis L. In other words, the trailer hitch mounts 20 extend through both the face plates 22 and the holes 16 of the frame rails 14. The trailer hitch mounts 20 may be fixed to the face plates 22 at the opening 24, e.g., as discussed above, the trailer hitch mount 20 may be welded at the opening 24 of the face plates 22, as shown in the Figures.

The trailer hitch assembly 18 may include collars 30 supported by the frame rails 14, respectively. Specifically, the collars 30 may be supported by the frame rails 14 at the ends 36 of each of the frame rails 14. The collars 30 may be fixed to the ends 36 of the frame rails 14. For example, as shown in the Figures, the collar 30 may be fixed to the frame rail 14 by welding. As other examples, the collar 30 may be fixed to the frame rail 14 in any suitable way, i.e., threaded fastener, adhesive, etc.

With reference to FIG. 6, the collars 30 may define a "U" shape. In other words, the collars 30 may partially surround the frame rails 14, i.e., the collars 30 may not completely surround the frame rails 14. The collars 30 may surround only three of the four sides of the frame rails 14. Specifically, the collars 30 may surround a bottom portion of the frame rails 14 and two sides of the frame rails 14.

With reference to FIGS. 4 and 5, the collars 30 each may extend along an exterior of the frame rails 14. Specifically, the collars 30 may extend along a distance D2 from the ends 36 of the frame rails 14 in the vehicle-forward direction along the vehicle-longitudinal axis L. As in the example shown in FIG. 4, the distance D2 the collars 30 extend along the frame rails 14 may be less than or equal to the distance D1 that the trailer hitch mounts 20 extend into the holes 16 of the frame rails 14. The distance D2 the collars 30 extend along the frame rails 14 may be greater than the distance D1 that the trailer hitch mounts 20 extend into the holes 16 of the frame rails 14. As in the example shown in FIG. 5, the distance D2 the collars 30 extend along the frame rails 14 may be less than the distance D1 that the trailer hitch mounts 20 extend into the holes 16 of the frame rails 14.

The trailer hitch mounts 20 are supported by the frame rails 14 and the collars 30. Specifically, the face plates 22 may be connected to the collars 30 to support trailer hitch mounts 20. The face plates 22 may abut the collars 30. Specifically, the collars 30 may have planar surfaces that abut the face plates 22 and, in such an example the face plate 22 may be planar as discussed above. As discussed above, the trailer hitch mounts 20 may be fastened by threaded fasteners to the frame rails 14. The trailer hitch mounts 20 may be fixed to the collar 30 by threaded fasteners 32, e.g., the face plates 22 may be connected to the collars 30 by threaded fasteners 32. The trailer hitch mounts 20 may be fixed in any suitable way to the frame rails 14 and the collars 30, e.g., welding, adhesive, etc.

The face plates 22 are between the collars 30 and the trailer hitch mounts 20. As an example and as shown in the Figures, the face plates 22 may be directly between the collars 30 and the trailer hitch mounts 20, i.e., no other components are between the collars 30 and the trailer hitch mounts 20 other than the face plates 22. In such an example, in other words, the face plates 22 may connect the trailer hitch mounts 20 to the collars 30. In another example, the face plates 22 may be indirectly between the collars 30 and the trailer hitch mounts 20, i.e., other components may be between the collars 30 and the trailer hitch mounts 20 other than the face plates 22.

The frame rails 14 may be between the trailer hitch mounts 20 and the collars 30 in a radial direction of the frame rail. In other words, the frame rails 14 may be between the trailer hitch mounts 20 and the collars 30 moves outwardly from the center of the holes 16 of the frame rails 14. As an example and as shown in the Figures, the frame rails 14 may be directly between the collars 30 and the trailer hitch mounts 20, i.e., no other components are between the collars 30 and the trailer hitch mounts 20 other than the face plates 22. In another example, the frame rails 14 may be indirectly between the collars 30 and the trailer hitch mounts 20, i.e., other components may be between the collars 30 and the trailer hitch mounts 20 other than the face plates 22.

With reference to FIGS. 1 and 2, the trailer hitch assembly 18 may include a trailer hitch beam 34 elongated cross-vehicle from the trailer hitch. Specifically, the trailer hitch beam 34 may extend from one of the trailer hitch mounts 20 to the other of the trailer hitch mounts 20. As in the example shown in the Figures, the trailer hitch beam 34 may extend through each of the trailer hitch mounts 20. The trailer hitch beam 34 may be fixed to each of the trailer hitch mounts 20. As in the example shown in the Figures, the trailer hitch beam 34 is welded to the trailer hitch mounts 20. The trailer hitch beam 34 may be fixed to the trailer hitch mounts 20 in any suitable way, e.g., fasteners, adhesive, etc.

With reference to FIGS. 4 and 5, the frame rails 14 may be crushable along the vehicle-longitudinal axis L. Specifically, the frame rails 14 may each include a crushable section D3 extending in the vehicle-forward direction from the collars 30. The crushable sections D3 of the frame rails 14 may be crushable relative to the rear rail casting 38, i.e., the rear rail casting 38 is rigid relative to the frame rails 14. The crushable sections D3 of the frame rails 14 may be crushable relative to the section, i.e., the distance D1, along which the trailer hitch mounts 20 extend in the holes 16 of the frame rails 14. In other words, the crushable sections D3 extend along the vehicle-longitudinal axis L between the collars 30 and the rear rail casting 38. The crushable sections D3 may be crushable relative to the distance D1 or distance D2, whichever is greater. Specifically, the crushable section D3 is greater than either distance D1 or distance D2. The shorter the distance D1 or the distance D2, the larger the crushable section D3 and the greater the absorption of energy in the event of a rear impact to the vehicle 10.

In the event of an impact to the vehicle 10, specifically a rear impact to the vehicle 10, the frame rails 14 may be crushable along the crushable sections D3 to absorb energy of the impact. In such an event, the frame rails 14 and the trailer hitch mounts 20 may stack up against the rear rail casting 38. The crushable sections D3 allow the frame rails 14 to crush relative to the rear rail casting 38 and the trailer hitch mounts 20 and absorb energy from the rear impact to the vehicle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle frame including a frame rail elongated along a vehicle-longitudinal axis, the frame rail defining a hole;
a trailer hitch mount supported by the frame rail; and
a face plate supported by the trailer hitch mount, the face plate defining an opening extending through the face plate and the opening being aligned with the hole of the frame rail;
the trailer hitch mount extending through the opening and being completely surrounded by the face plate and the trailer hitch mount extending into the hole of the frame rail along the vehicle-longitudinal axis; and
the trailer hitch mount being fixed to the frame rail with a fastener extending through the trailer hitch mount and the frame rail.

2. The vehicle of claim 1, further comprising a collar fixed to the frame rail, the face plate being connected to the collar.

3. The vehicle of claim 2, wherein the collar is at an end of the frame rail and extends a distance from the end of the frame rail in a vehicle-forward direction along the vehicle-longitudinal axis greater than a distance that the trailer hitch mount extends from the end of the frame rail in the vehicle-forward direction.

4. The vehicle of claim 3, wherein the frame rail includes a crushable section extending in the vehicle-forward direction from the collar, the crushable section being crushable relative to a section of the frame rail along which the trailer hitch mount extends in the hole.

5. The vehicle of claim 4, wherein the frame rail has a hollow rectangular cross-section in a plane perpendicular to the vehicle-longitudinal axis.

6. The vehicle of claim 2, wherein the face plate is between the collar and the trailer hitch mount.

7. The vehicle of claim 2, wherein the face plate abuts the collar.

8. The vehicle of claim 2, wherein the face plate is connected to the collar with threaded fasteners.

9. The vehicle of claim 2, wherein the trailer hitch mount is supported by the frame rail and the collar.

10. The vehicle of claim 2, wherein the frame rail includes a crushable section in the vehicle-forward direction from the collar, the crushable section being crushable relative to a section of the frame rail along which the trailer hitch mount extends in the hole.

11. The vehicle of claim 2, wherein the frame rail is between the trailer hitch mount and the collar in a radial direction of the frame rail.

12. The vehicle of claim 1, wherein the face plate is planar in a substantially vertical plane.

13. The vehicle of claim 1, further comprising a trailer hitch beam elongated cross-vehicle from the trailer hitch mount.

14. The vehicle of claim 1, wherein the frame rail has a hollow rectangular cross-section in a plane perpendicular to the vehicle-longitudinal axis.

15. The vehicle of claim 1, wherein:
the vehicle frame including a second frame rail elongated along the vehicle-longitudinal axis and spaced cross-vehicle from the frame rail, the second frame rail defining a second hole;
a second trailer hitch mount supported by the second frame rail;
a second face plate supported by the second trailer hitch mount, the second face plate defining a second opening extending through the second face plate and the second opening being aligned with the second hole of the second frame rail; and
the second trailer hitch mount extending through the second opening and being completely surrounded by the second face plate and the second trailer hitch mount extending into the second hole of the second frame rail along the vehicle-longitudinal axis.

16. The vehicle of claim 15, further comprising a trailer hitch beam elongated cross-vehicle from the trailer hitch mount to the second trailer hitch mount.

17. The vehicle of claim 16, wherein, the trailer hitch beam extends through the trailer hitch mount and the second trailer hitch mount.

18. The vehicle of claim 15, further comprising:
a collar is at an end of the frame rail and extends a distance from the end of the frame rail in a vehicle-forward direction along the vehicle-longitudinal axis greater than a distance that the trailer hitch mount extends from the end of the frame rail in the vehicle-forward direction; and
a second collar is at an end of the second frame rail and extends a distance from the end of the second frame rail in the vehicle-forward direction along the vehicle-longitudinal axis greater than a distance that the second trailer hitch mount extends from the end of the second frame rail in the vehicle-forward direction.

19. The vehicle of claim 18, wherein the second frame rail includes a crushable section extending in the vehicle-forward direction from the second collar, the crushable section being crushable relative to a section of the second frame rail along which the second trailer hitch mount extends in the second hole.

20. The vehicle of claim 1, wherein the face plate is welded to the trailer hitch mount.

21. A vehicle comprising:
a vehicle frame including a frame rail elongated along a vehicle-longitudinal axis, the frame rail defining a hole;
a trailer hitch mount supported by the frame rail;
a face plate supported by the trailer hitch mount, the face plate defining an opening extending through the face plate and the opening being aligned with the hole of the frame rail; the trailer hitch mount extending through the opening and being completely surrounded by the face plate and the trailer hitch mount extending into the hole of the frame rail along the vehicle-longitudinal axis; and
a collar fixed to the frame rail, the face plate being connected to the collar;
the collar being at an end of the frame rail and extending a distance from the end of the frame rail in a vehicle-forward direction along the vehicle-longitudinal axis greater than a distance that the trailer hitch mount extends from the end of the frame rail in the vehicle-forward direction.

* * * * *